(12) United States Patent
Lechner et al.

(10) Patent No.: US 10,605,621 B2
(45) Date of Patent: Mar. 31, 2020

(54) METHOD AND DEVICE FOR DETERMINING A SENSOR SIGNAL

(71) Applicant: Robert Bosch GmbH, Stuttgart (DE)

(72) Inventors: Benjamin Lechner, Neuhausen (DE); Daniel Raichle, Vaihingen (DE); Daniel Zirkel, Wiernsheim-Serres (DE); Michael Ungermann, Darmstadt (DE)

(73) Assignee: Robert Bosch GmbH, Stuttgart (DE)

(*) Notice: Subject to any disclaimer, the term of this patent is extended or adjusted under 35 U.S.C. 154(b) by 241 days.

(21) Appl. No.: 15/737,662

(22) PCT Filed: Jun. 13, 2016

(86) PCT No.: PCT/EP2016/063512
§ 371 (c)(1),
(2) Date: Dec. 18, 2017

(87) PCT Pub. No.: WO2016/202743
PCT Pub. Date: Dec. 22, 2016

(65) Prior Publication Data
US 2018/0188070 A1    Jul. 5, 2018

(30) Foreign Application Priority Data

Jun. 18, 2015 (DE) .................. 10 2015 211 260

(51) Int. Cl.
*G01D 1/16* (2006.01)
*G01D 5/20* (2006.01)
(Continued)

(52) U.S. Cl.
CPC .............. *G01D 1/16* (2013.01); *G01D 1/02* (2013.01); *G01D 5/20* (2013.01); *G01D 5/2291* (2013.01)

(58) Field of Classification Search
CPC .. G01D 1/02; G01D 1/16; G01D 5/20; G01D 5/2291
(Continued)

(56) References Cited

U.S. PATENT DOCUMENTS

2006/0115103 A1* 6/2006 Feng ...................... H04R 1/406
  381/313
2011/0224922 A1* 9/2011 Kirillov ................ G01M 15/12
  702/56
(Continued)

FOREIGN PATENT DOCUMENTS

CN    1060942 A    5/1992
CN    1146096 A    3/1997
(Continued)

OTHER PUBLICATIONS

International Search Report for Application No. PCT/EP2016/063512 dated Sep. 28, 2016 (English Translation, 3 pages).

*Primary Examiner* — John H Le
(74) *Attorney, Agent, or Firm* — Michael Best & Friedrich LLP

(57) ABSTRACT

The present invention relates to the determining of a sensor signal. For example, an enveloping waveform of the signal from a rotational angle sensor can be reconstructed for this purpose. To this end, a predefined number of successively sampled values of a signal from a rotational angle sensor are multiplied with the elements of a weighting vector. On the basis of a measurement vector weighted in this way, an enveloping waveform of a signal curve from a rotational angle sensor can then be determined and, therefrom, a phase angle can be calculated.

13 Claims, 2 Drawing Sheets

(51) Int. Cl.
*G01D 1/02* (2006.01)
*G01D 5/22* (2006.01)

(58) Field of Classification Search
USPC ............... 702/94, 72, 74, 151, 86, 92, 101; 381/313
See application file for complete search history.

(56) References Cited

U.S. PATENT DOCUMENTS

| | | |
|---|---|---|
| 2013/0188176 A1 | 7/2013 | Lovely et al. |
| 2014/0142782 A1 | 5/2014 | Fu et al. |
| 2017/0279394 A1* | 9/2017 | Miura .................... H02P 6/08 |

FOREIGN PATENT DOCUMENTS

| | | |
|---|---|---|
| CN | 1432789 A | 7/2003 |
| CN | 1576850 A | 2/2005 |
| CN | 1740751 A | 3/2006 |
| CN | 1801596 A | 7/2006 |
| CN | 101093972 A | 12/2007 |
| CN | 102017391 A | 4/2011 |
| DE | 2315347 | 10/1974 |
| DE | 102011078583 | 1/2013 |
| EP | 2053364 | 4/2009 |
| WO | 9922287 | 5/1999 |

* cited by examiner

METHOD AND DEVICE FOR DETERMINING A SENSOR SIGNAL

BACKGROUND OF THE INVENTION

The present invention relates to a method and an apparatus for determining a sensor signal.

Electric and hybrid vehicles are becoming increasingly important. Regulation of permanently excited synchronous machines (PSM) and electrically excited synchronous machines (ESM), as are used in such vehicles, requires knowledge of the rotor angle of such machines. In addition, regulation of asynchronous machines (ASM) requires knowledge of the electrical frequency of the drive. The rotor angle and the electrical frequency can be ascertained using different types of sensor. For example, sensors based on the Eddy current effect, resolvers or digital angle sensors are possible.

A resolver is excited in this case using a preferably sinusoidal carrier signal, for example. The receiver signals obtained from the resolver in this case are normally perturbed, amplitude-modulated voltages from whose envelope it is possible to obtain the information about the rotor position.

The German patent application DE 10 2011 078 583 A1 discloses evaluation of resolver signals in a vehicle, for example. To this end, a resolver picks up a rotary movement of a rotor, and a processor element processes the sinusoidal and cosinusoidal output signals of the resolver.

There is a need for reliable determination of a sensor signal. In particular, there is a need for reliable determination of a rotor angle, for example, even for a perturbed output signal of a sensor.

SUMMARY OF THE INVENTION

To this end, the present invention according to a first aspect provides an apparatus for determining a sensor signal.

Accordingly, the present invention provides an apparatus for determining a sensor signal having a recording device, a memory, a weighting device and a computation device. The recording device is designed to record an angle signal at a predetermined sampling rate. In particular, the recording device can record an output signal from a rotation angle sensor at a predetermined sampling rate. The memory is designed to store a plurality of successive sampled measurement signals. The weighting device is designed to multiply a measured value vector by a predetermined weighting vector. In this case, the measured value vector is obtained as a vector having a plurality of measurement signals stored in the memory. In particular, the number of elements of the measured value vector corresponds to the number of elements of the weighting vector. This multiplication involves a respective element of the weighting vector being multiplied by an element of the measured value vector. The result output by the weighting device is a weighted measured value vector that has the same number of elements as the measured value vector and the weighting vector. The computation device is designed to compute a sensor signal based on the weighted measured value vector.

According to a further aspect, the present invention provides a method for determining a sensor signal.

Accordingly, the present invention provides a method for determining a sensor signal having the steps of recording a measurement signal at a first sampling rate; storing the sampled values of the measurement signal; multiplying a predetermined number of stored sampled values of the measurement signal by a weighting vector; and computing a sensor signal using the element-by-element product of the stored sampled values and the weighting vector.

The present invention is based on the concept of computing a sensor signal not only by evaluating single sampled measured values, such as the output signal from an angular position sensor, for example, but rather by evaluating a plurality of successive sampled measured values together. To this end, a plurality of successive sampled measured values can be individually weighted. This individual weighting of the sampled measured values allows computation of the sensor signal. In particular, this weighted evaluation of a plurality of sampled measured values allows the determination of an enveloping signal profile of the output signals of an angular position sensor, for example.

Given a suitable choice of weighting vectors, it is now possible to reliably suppress a possible DC component (offset), inter alia, so that errors in the computation on account of a DC component can be avoided. By scaling the number of weighted sampled measured values, it is now possible for the method to be individually customized to the available computation capacity for the evaluation.

The use of a variable weighting vector instead of a firmly programmed weighting of measured values furthermore allows simple individual customization of the evaluation without this requiring complete reprogramming to be effected.

According to one embodiment, the weighting vector is customizable. By way of example, the weighting vector can be stored in a memory of the weighting apparatus. By simply overwriting this weighting vector, it is possible for the individual weighting of the sampled measured values to be customized without this requiring complete reprogramming.

According to one embodiment, the apparatus further comprises a synchronization apparatus that is deigned to customize the elements of the weighting vector based on a phase angle of the sampled measurement signal. In particular, the weighting vectors can now be customized based on a phase angle of an excitation of a rotation angle sensor.

According to a further embodiment, the computation device is designed to sum the elements of the weighted measured value vector and to carry out the computation of the sensor signal using the summed elements of the measured value vector. This allows fast and reliable computation of the sensor signal.

According to one embodiment, the measurement signal comprises two measurement signals phase-shifted relative to one another. By way of example, these may be a sine signal and a cosine signal of a resolver. The weighting device can now multiply the two measurement signals by an applicable weighting vector. The computation device can then carry out the computation of the sensor signal using the two weighted measurement signals.

According to a further embodiment, the weighting device is designed to select a weighting vector from a plurality of stored weighting vectors. In this manner, customization of the weighting can be effected very quickly to adapt to changed constraints.

According to a further embodiment of the method for determining the sensor signal, the method comprises a step for synchronizing the weighting vector based on a phase angle of the sampled measurement signal. In particular, the synchronization of the weighting vector can be effected based on the phase angle of an excitation signal of a resolver.

According to a further aspect, the present invention provides a drive system having an electrical machine, a rotation angle sensor and an apparatus according to the invention for determining a phase angle. The electrical machine is coupled to a driveshaft in this arrangement. The rotation angle sensor is likewise coupled to the driveshaft. Further, the rotation angle sensor is designed to provide an angle signal corresponding to the phase angle of the driveshaft.

According to one embodiment, the rotation angle sensor comprises a resolver in this arrangement.

Further embodiments and advantages of the present invention will emerge from the description below with reference to the accompanying drawings.

DETAILED DESCRIPTION

Figure 1:
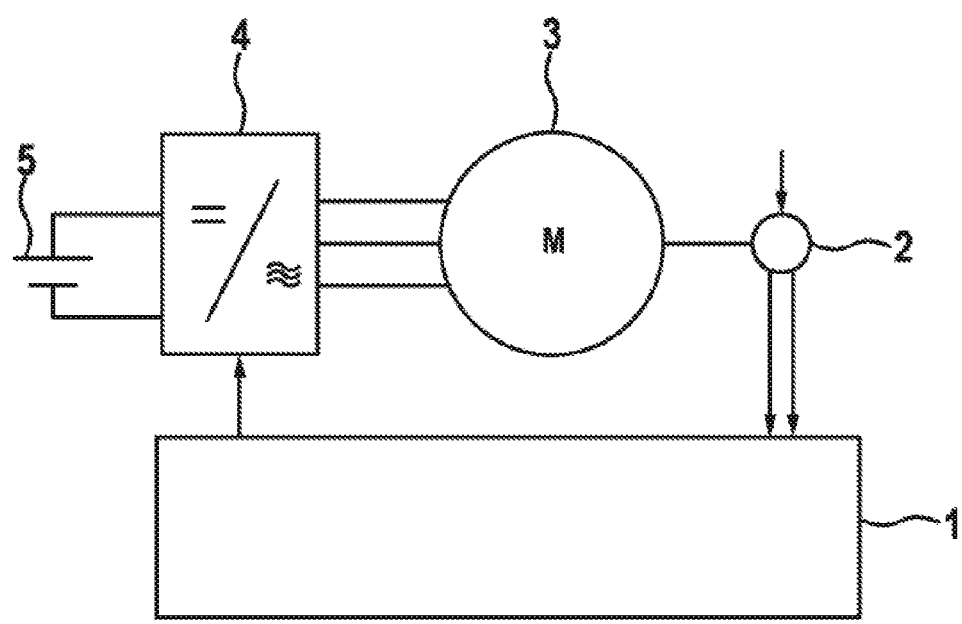
FIG. 1: shows a schematic depiction of an electrical drive system according to an embodiment.

FIG. 1 shows a schematic depiction of an electrical drive system according to an embodiment. An electrical machine 3 is supplied with power by an electrical energy source 5 via a converter 4. By way of example, the electrical energy source 5 may be a traction battery of an electric vehicle. The electrical machine 3 may be a permanently excited synchronous machine, an electrically excited synchronous machine or else an asynchronous machine, for example. Fundamentally, other electrical machines are also additionally possible. The embodiment of a three-phase electrical machine 3 depicted here was just one exemplary embodiment in this case. Furthermore, electrical machines having a different number of phases than three are also possible. The converter 4 converts the electrical energy provided by the electrical energy source 5 and provides the converted electrical energy for actuating the electrical machine 3. The electrical machine 3 can in this case be actuated based on stipulations or control signals from the control apparatus 1. Furthermore, when the electrical machine 3 is slowed down, it is also possible for kinetic energy to be converted into electrical energy by the electrical machine 3 and for this electrical energy to be supplied to an electrical energy store of the energy source 5 via the converter 4.

Regulation of a permanently or electrically excited synchronous machine now requires knowledge of the position of the rotor in this machine. Further, regulation of asynchronous machines requires knowledge of the electrical frequency of such a machine. To this end, the electrical machine 3 can be coupled to a rotation angle sensor 2. By way of example, the rotation angle sensor 2 can be coupled to the drive axis of the electrical machine 3. By way of example, for determining the rotor position and/or the electrical frequency of the machine 3, sensors based on the Eddy current effect, digital angle sensors or what are known as resolvers are possible.

In a resolver, a housing normally has two stator windings having a 90° electrical offset arranged in it that enclose a rotor with a rotor winding that is mounted in the housing. Fundamentally, various alternatives for ascertaining the angular position are possible, one possibility from which is described by way of example below. By way of example, the rotor winding of the resolver can be excited using a sinusoidal AC voltage. The amplitudes of the voltages induced in the two stator windings of the resolver are now dependent on the angular position of the rotor and are related to the sine and the cosine of the angular position of the rotor. It is therefore possible for the angular position of the rotor to be computed from the arctangent (arctan) to the signals of the two stator windings of the resolver.

The resolver is now excited using a carrier signal. The carrier signal is typically sinusoidal, but may also have other signal forms. The output signal delivered by the resolver is amplitude-modulated signals whose envelopes include the information about the rotor position. The aim of an angle computation is therefore to determine the rotor position (the phase angle) from the amplitude-modulated output signals of the resolver.

Figure 2:
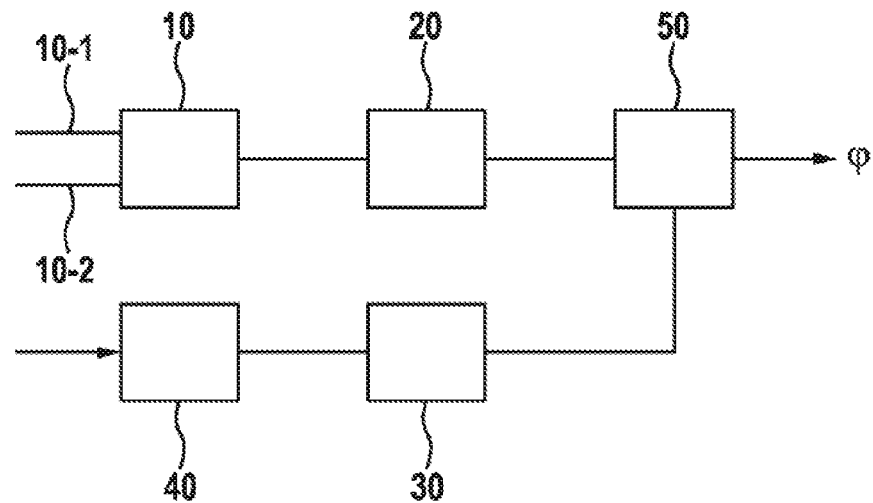
FIG. 2: shows a schematic depiction of an apparatus for determining a phase angle according to an embodiment.

FIG. 2 shows a schematic depiction of an apparatus for determining a phase angle according to an embodiment. The signals 10-1 and 10-2 of the resolver are first of all supplied to a sampling apparatus 10 in this case. The sampling apparatus 10 may be an analog-to-digital converter, for example. The sampling apparatus 10 samples the signals of the resolver at a prescribed, normally constant, sampling rate. The sampled values are then first of all buffer-stored in a memory 20 for further processing. The memory 20 may be a cyclic memory, for example, that stores a predetermined number of sampled values. When a further value is written in, the respective oldest stored value is now overwritten. Other memory types are likewise possible, however. By way of example, the memory 20 can store ten respective sampled measured values for each sampled signal. A different number of sampled measured values for each sampled signal is furthermore likewise possible. A weighting device 30 further stores a weighting vector. The weighting vector may be firmly stored in the weighting apparatus 30 in this case. Alternatively, it is also possible for the weighting vector to be able to be overwritten or altered by an external apparatus (not depicted here). Further, the weighting apparatus 30 can also comprise a memory that stores a plurality of different weighting vectors. In this case, one of the plurality of stored weighting vectors can be selected for the further processing based on predetermined parameters. Fundamentally, it is also possible for the weighting vector to be dynamically customized based on received further parameters or sensor signals.

Depending on the parameterization of the weighting vector, the weighting vectors can simulate even already known methods for reconstructing the envelope of the signal profile from the output signals of an angular position sensor. Some examples of possible weighting vectors and their corresponding method are reproduced below in this regard. In this case, the chosen number of ten elements for the weighting vector serves merely to improve comprehension and is not intended to be a restriction for the number of elements for a weighting vector.

a=[0 0 1 0 0 0 0 0 0 0] max method
a=[0 0 0 0 0 0 0 –1 0 0] min method
a=[0 0 0 1 0 0 0 –1 0 0] min/max method
a=[1 1 1 1 1 –1 –1 –1 –1 –1] integration method
$a_i=\sin(i/10*2*\pi)$ where i=0.9 coherent demodulation with moving average as low-pass filter Furthermore, depending on the application, arbitrary further weighting vectors a are likewise possible. In particular, the use of point symmetrical weighting vectors allows a possible DC component (offset) to be suppressed during measurement of the signals from the rotation angle sensor. Further, it is also possible for offline customization to be effected, particularly when there is a nonsinusoidal excitation signal for the rotation angle sensor, by customizing the elements of the weighting vector. If disturbances (for example disturbance peaks) are furthermore detected in the signals from the rotation angle sensor, for example, then the applicable weighting vector can also be individually customized to such a detected disturbance signal online. This allows a detected disturbance signal to be rejected, for example. By way of example, when the switching times of power electronics in the surroundings of the rotation angle sensor are known, a disturbance caused by these switching processes can be suppressed. Furthermore, it is also possible for customization of the elements of the weighting vector to already attain a desired filter property for the signal processing.

As already mentioned previously, the chosen number of ten elements for the weighting vector is intended to be understood only by way of example. In particular, the number of elements of the weighting vector can be customized in this case to the available computation capacity of the overall system.

The weighting device 30 customizes the weighting vector a to the further constraints if need be and then multiplies a respective element of the weighting vector by an element of a measured value vector that is formed from the plurality of sampled angle signals stored in the memory 20. In this case, the measured value vector has the same number of elements as the weighting vector. The result obtained for this multiplication is therefore a weighted measured value vector.

Based on this weighted measured value vector, the enveloping signal profiles of the signals provided by the rotation angle sensor are then determined by summation of all the elements of the weighted measured value vector and computation of the phase angle corresponding thereto. The phase angle can be computed in this case based on known or novel methods in a computation device 50.

The method will be described once again in more detail below.

In a first step, the last sample is first of all identified before the computation. In this step, the last sample is identified before a reference time in a computing grid. By way of example, this can be accomplished by virtue of the timestamp of the samples being compared with a timestamp of a reference time in the computing grid.

Subsequently, synchronization is effected to orient the weights of the weighting vector. This requires a precise phase angle of the carrier in the excitation signal. For this synchronization, that is to say the ascertainment of the phase angle, a synchronization signal is now provided that can be obtained from the excitation signal read back or from the measurement signals, for example. This synchronization can be effected in a synchronization apparatus 40, for example.

Against the background of the exact phase angle of the carrier in the excitation signals that have been ascertained during the synchronization, and possibly further criteria, such as detection of disturbances, for example, or the determination of switching times, it is then possible to ascertain a suitable weighting vector.

The sampled measured values in the memory 20 are multiplied, as elements of a measurement vector, by the elements of the weighting vector, in each case on an element-by-element basis, and are subsequently summed.

Subsequently, the enveloping waveform of the amplitude-modulated output signals of the rotation angle sensor is computed, and the phase angle is computed therefrom. For later dead-time compensation, it is furthermore possible for a dead time between the time at which the value of the enveloping waveform has been reconstructed and a reference time in the computing grid to be ascertained.

Figure 3:
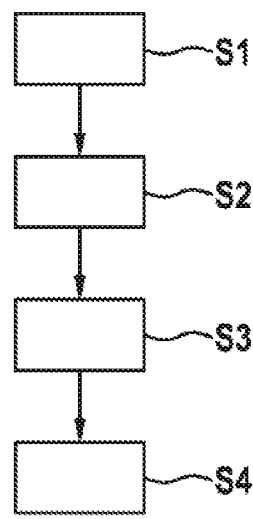
FIG. 3: shows a schematic depiction of a flowchart as forms the basis for a method according to an embodiment.

FIG. 3 shows a depiction of a flowchart as forms the basis for a method for determining a sensor signal according to an embodiment.

In step S1, one or more measurement signals are first of all sampled at a first sampling rate. Subsequently, in step S2, the sampled values are stored. As already described previously, a weighting vector can then be read or if need be computed and customized. Then, in step S3, a predetermined number of stored sampled values of the measurement signal is multiplied by the elements of the weighting vector. In step S4, the sensor signal is then computed using the product of the sampled values and the weighting vector.

In summary, the present invention relates to the reconstruction of an enveloping waveform of a measurement signal to determine a sensor signal. By way of example, the signal of a rotation angle sensor (particularly a resolver) can be processed to reconstruct a rotor angle. To this end, a prescribed number of successive sampled values of a signal from a rotation angle sensor is multiplied by the elements of a weighting vector. Based on a measurement vector weighted in this manner, it is then possible for an enveloping waveform of a signal profile from a rotation angle sensor to be determined and for a phase angle to be computed therefrom.

The invention claimed is:

1. An apparatus for determining a sensor signal, the apparatus comprising:
a recording device that is designed to record a measurement signal at a predetermined sampling rate, wherein the measurement signal comprises two measurement signals phase-shifted relative to one another;
a memory that is designed to store a plurality of successive sampled measurement signals;
a weighting device that is designed to multiply a measured value vector having the plurality of stored measurement signals by a predetermined weighting vector and to output the result as a weighted measured value vector, wherein the weighting device multiplies the two measurement signals by the weighting vector; and
a computation device that is designed to compute the sensor signal based on the weighted measured value vector, wherein the computation device carries out the computation of the sensor signal using the two weighted measurement signals.

2. The apparatus as claimed in claim 1, wherein the weighting vector is customizable.

3. The apparatus as claimed in claim 1, further comprising a synchronization apparatus that is designed to customize elements of the weighting vector based on a phase angle of the sampled measurement signal.

4. The apparatus as claimed in claim 1, wherein the computation device is designed to sum elements of the weighted measured value vector and to carry out the computation of the sensor signal using the summed elements of the measured value vector.

5. The apparatus as claimed in claim 1, wherein the weighting device is designed to select the weighting vector from a plurality of stored weighting vectors.

6. The apparatus as claimed in claim 1, wherein the recording device is designed to record the measurement signal of a phase angle from a rotation angle sensor at the predetermined sampling rate.

7. A drive system, comprising:
an electrical machine that is coupled to a driveshaft;

a rotation angle sensor that is coupled to the driveshaft and that is designed to provide a measurement signal corresponding to the angular position of the driveshaft; and an apparatus for processing a sensor signal having
- a recording device that is designed to record the measurement signal at a predetermined sampling rate;
- a memory that is designed to store a plurality of successive sampled measurement signals;
- a weighting device that is designed to multiply a measured value vector having the plurality of stored measurement signals by a predetermined weighting vector and to output the result as a weighted measured value vector; and
- a computation device that is designed to compute a sensor signal based on the weighted measured value vector.

8. The drive system as claimed in claim 7, wherein the rotation angle sensor comprises a resolver.

9. The drive system as claimed in claim 7, wherein the electrical machine is one from a group consisting of: a permanently excited synchronous machine, an electrically excited synchronous machine, and an asynchronous machine.

10. The drive system as claimed in claim 7, wherein the drive system and the electrical machine are part of an electric vehicle.

11. A method for determining a sensor signal, comprising:
- recording a measurement signal at a first sampling rate, wherein the measurement signal comprises two measurement signals phase-shifted relative to one another;
- storing the sampled value of the measurement signal;
- multiplying a predetermined number of stored sampled values of the measurement signal by a weighting vector, wherein the multiplying comprises a multiplication of the two measurement signals by the weighting vector, and a weighted measured value vector is output; and
- computing the sensor signal using the sum of the products of the stored sampled values and the weighting vector, wherein the computation of the sensor signal is carried out using the two weighted measurement signals.

12. The method as claimed in claim 11, further comprising synchronizing the weighting vector based on a phase angle of the sampled value of the measurement signal.

13. The method according to claim 11, wherein the recording of the measurement signal is of a phase angle from a rotation angle sensor.

* * * * *